United States Patent
Matsuura et al.

[11] Patent Number: 5,121,041
[45] Date of Patent: Jun. 9, 1992

[54] TRACING CONTROL SYSTEM

[75] Inventors: Hitoshi Matsuura, Hachioji; Hitoshi Aramaki, Hino, both of Japan

[73] Assignee: Fanuc Ltd., Minamitsuru, Japan

[21] Appl. No.: 667,384

[22] PCT Filed: Jul. 20, 1990

[86] PCT No.: PCT/JP90/00939
§ 371 Date: Mar. 25, 1991
§ 102(e) Date: Mar. 25, 1991

[87] PCT Pub. No.: WO91/02625
PCT Pub. Date: Mar. 7, 1991

[30] Foreign Application Priority Data
Aug. 25, 1989 [JP] Japan .................. 1-219833

[51] Int. Cl.$^5$ .............................. G05B 19/18
[52] U.S. Cl. .................... 318/578; 318/570; 318/571; 364/474.03; 364/474.35; 364/167.01; 409/80; 409/99
[58] Field of Search ................. 318/560–630; 364/474.01–474.33, 167–179; 409/88, 89, 90, 98, 99, 80, 127

[56] References Cited
U.S. PATENT DOCUMENTS

| | | | |
|---|---|---|---|
| 4,639,172 | 1/1987 | Kishi et al. | 318/570 X |
| 4,646,225 | 2/1987 | Matsuura | 318/578 X |
| 4,746,251 | 5/1988 | Yoshikawa et al. | 318/578 X |
| 4,814,998 | 3/1989 | Aramaki | 364/474.03 |
| 4,912,385 | 3/1990 | Kawamura et al. | 318/603 |
| 5,015,130 | 5/1991 | Matsuura et al. | 409/80 |

FOREIGN PATENT DOCUMENTS
0074462 3/1982 European Pat. Off.

*Primary Examiner*—Paul Ip
*Attorney, Agent, or Firm*—Staas & Halsey

[57] ABSTRACT

A tracing control system for machining a workpiece through tracing by calculating speed commands of respective axes, using change amounts detected by a tracer head, and by moving a cutter relative to the workpiece through a control of the speed of the respective axes in accordance with the speed commands. First delay speed commands are obtained from the speed commands (Vx, Vz) at delay circuits (14a, 14c), respectively, and second delay speed commands are obtained at second delay circuits (14b, 14d), respectively, the differences between the first delay speed commands and the above second delay speed commands are calculated, and an X-axis main motor and a Z-axis main motor are driven in accordance with the first delay speed commands, and an X-axis sub-motor and a Z-axis sub-motor are driven in accordance with the calculated differences, thereby move the tracer head. As a result, the tracer head always precedes the cutter, and when the tracer head comes to a corner and the axis speed is reduced, the precedence amount of the tracer head is canceled out (relatively returned) by the amount corresponding to the speed reduction. This return amount can be made equal to the amount of over-run of the tracer head, and therefore, the amount of movement of the cutter is reduced by this over-run amount of the tracer head, to thereby prevent overshot machining.

3 Claims, 3 Drawing Sheets

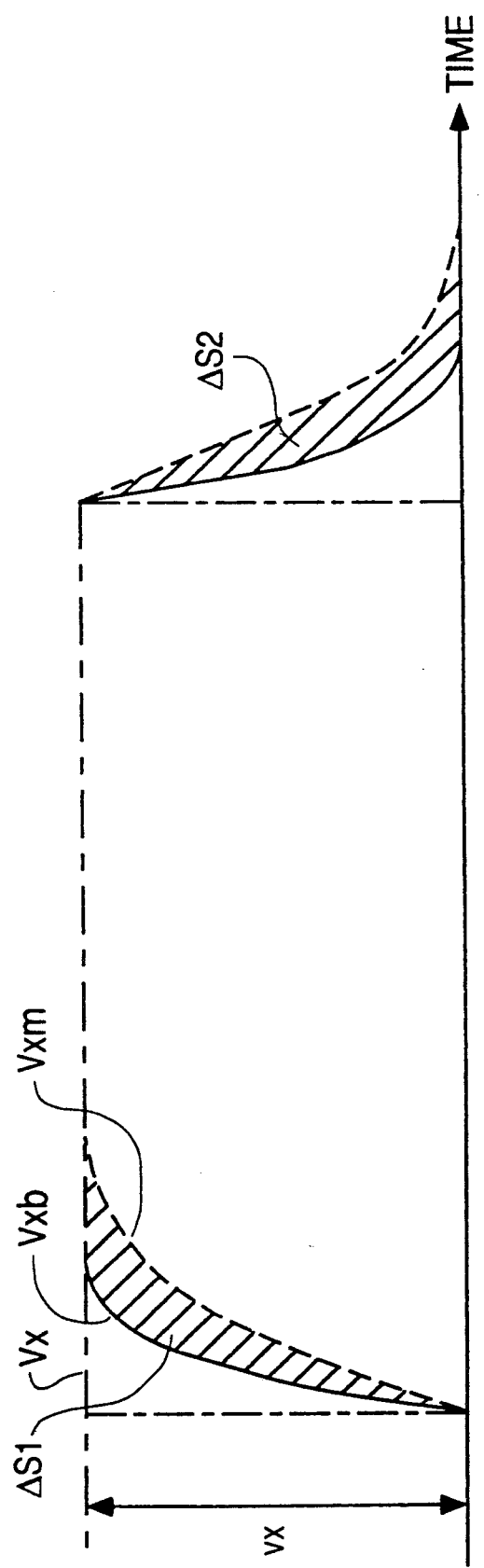

TRACING CONTROL SYSTEM

TECHNICAL FIELD

The present invention relates to a tracing control system, and more particularly, to a tracing control system by which overshot machining at corners and the like of a workpiece is prevented.

BACKGROUND ART

A tracing control system uses a tracer head to detect amounts of displacement of respective axes applied to a stylus, and speed command values of the respective axes are calculated in a tracing calculating circuit by using these amounts of displacement. A cutter is moved relative to a workpiece by drive motors of the respective axes, in accordance with these speed command values, and at the same time, the tracer head is moved along the surface of a model at the same speed. This motion is repeated, and accordingly, the workpiece is machined to the same shape as the model.

Tracing control systems of this kind, however, have a problem in that regions of the model at which the shape is abruptly changed cannot be precisely traced. Namely, when the stylus comes to corners and the like of the model, an over-run of the tracer head occurs due to a delay in the reaction of the servo systems, or to the inertia of the machine or the like, and as a result, the overshot machining into the workpiece by the amount of over-run, and thus the machining precision at corners is lost.

DISCLOSURE OF THE INVENTION

The present invention has been created in view of the aforesaid drawbacks, and an object thereof is to provide a tracing control system by which overshot machining at corners, etc., of a workpiece is prevented, and thus the tracing control system has a high precision.

To achieve the above object, in accordance with the present invention there is provided a tracing control system for machining a workpiece through tracing by calculating speed commands of respective axes, using change amounts detected by a tracer head, by moving a cutter relative to the workpiece through a control of the speed of the respective axes in accordance with the speed commands, and by moving the above tracer head along the surface of the model, comprising a first delay means for obtaining first delay speed commands by delaying the above speed commands by predetermined time constants, a second delay means for obtaining second delay speed commands by delaying the above speed commands by time constants different from the above predetermined time constants, a difference calculating means for calculating differences between the above first delay speed commands and the above second delay speed commands, a first axis moving means for moving a predetermined axis based on the above first delay speed commands, and a second axis moving means for moving a specific axis in a manner such that it is superimposed on movement of the above predetermined axis and is parallel with the above predetermined axis, based on the above differences.

In addition to a conventional entire machine axis, an axis for moving only a tracer head in a manner such that it is superimposed on a movement of this entire machine axis is provided, and two delay speed commands are obtained by delaying speed commands by different time constants. One of the delay speed commands is used for the entire machine axis, and the difference between the speed commands for the axis is used for moving only the tracer head. As a result, the tracer head always precedes the cutter, and when the tracer head comes to a corner and the axis speed is reduced, the amount by which the tracer head precedes the cutter is canceled out (relatively returned) by the amount corresponding to the reduction in the axis speed. This return amount can be made equal to the over-run amount of the tracer head by setting each of the time constants of the delay speed commands at appropriate values, and thus the amount of movement of the cutter is reduced by the amount of this over-run of the tracer head, and accordingly, the overshot machining is prevented.

BRIEF DESCRIPTION OF THE DRAWINGS

FIG. 4 is a graph showing chronological changes of the respective speed commands of one embodiment of the present invention.

BEST MODE OF CARRYING OUT THE INVENTION

An embodiment of the present invention will hereinafter be described with reference to the drawings.

Figure 1:
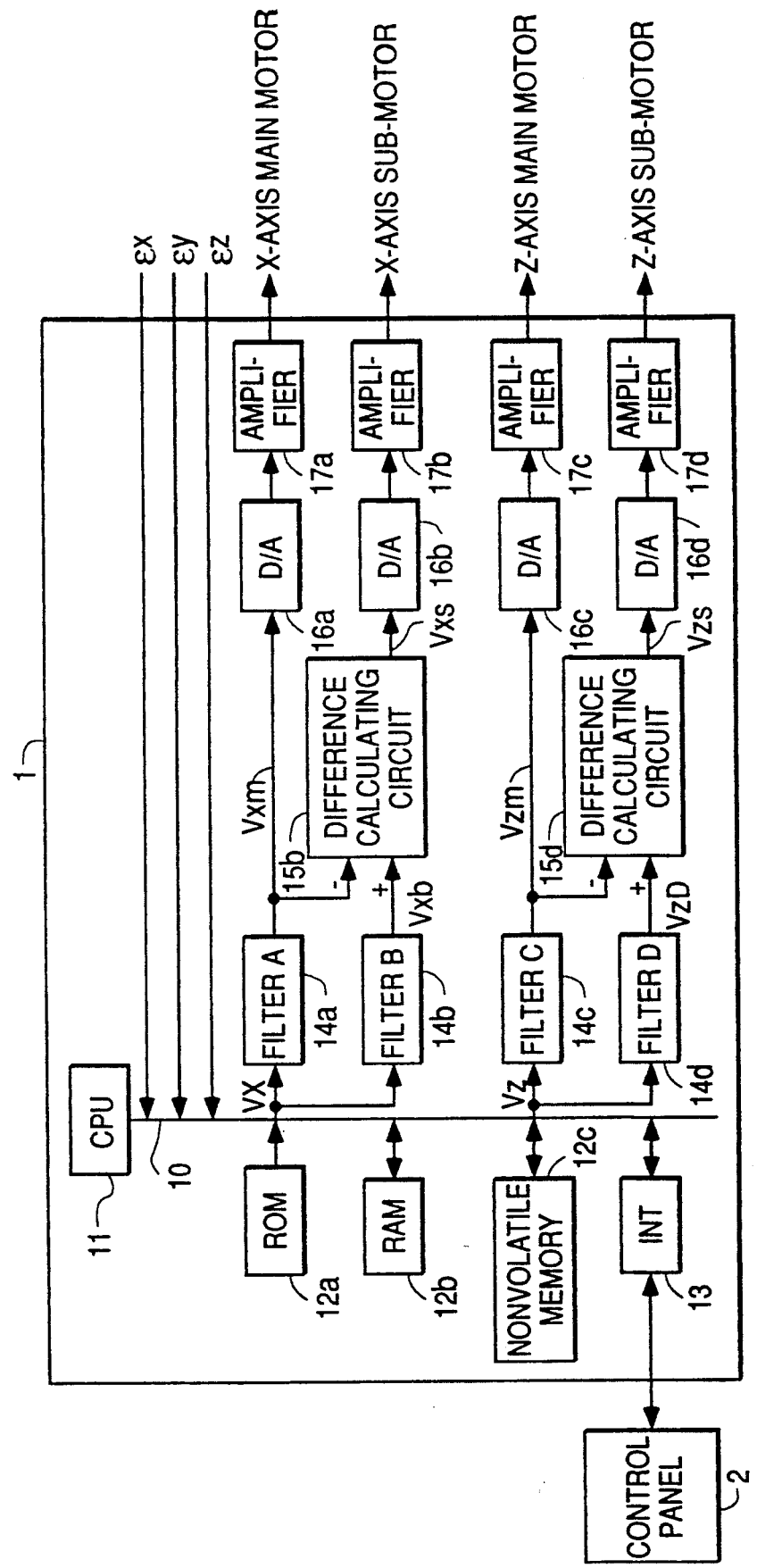
FIG. 1 is a block diagram showing the hardware of a tracing control system according to an embodiment of the present invention.

FIG. 1 is a block diagram showing the hardware of a tracing control system according to an embodiment of the present invention. In FIG. 1, a processor 11 reads a system program stored in a ROM 12a, through a bus 10, and controls the overall operation of a tracing control system 1 according to the system program. A RAM 12b stores amounts $\epsilon x$, $\epsilon y$, $\epsilon z$ of displacement of respective axes detected by a tracer head, which will be described later, and other temporary data. A nonvolatile memory 12c is backed up by a battery (not shown), and stores various parameters such as tracing directions, tracing speeds, etc., entered from a control panel 2 through an interface 13.

The processor 11 generates, for example, speed commands Vx in the X-axis direction and Vz in the Z-axis direction for surface tracing by the X-Z axes based on the amounts $\epsilon x$, $\epsilon y$, $\epsilon z$ of displacement of the respective axes, and the commanded tracing direction and tracing speed, according to the known process. The speed command Vx is processed by a filter A14a with a predetermined leading time constant and trailing time constant, and becomes a delay speed command Vxm. The delay speed command Vxm is then converted to analog values by a D/A converter 16a, amplified by a servo amplifier 17a, and output, and accordingly, a main motor of the X-axis, which will be described later, is driven.

At the same time, the speed command value Vx is converted into a delay speed command Vxb by a filter B14b having a leading time constant and a trailing time constant different from those of the delay speed command Vxm, and then a difference calculating circuit 15b subtracts the delay speed command Vxm from the delay speed command Vxb to obtain a delay speed command Vxs. The delay speed command Vxs is converted to analog values by a D/A converter 16b, amplified by a servo amplifier 17b, and output, and accordingly, a sub-motor of the X-axis, which will be described later, is driven.

Delay speed commands Vzm and Vzs are obtained in the same way from the speed command Vz, and a main motor of the Z-axis and a sub-motor of the Z-axis are driven in accordance with these delay speed commands. The elements (filters C 14c and D 14d through to amplifiers 17c and 17d) used for this process are the same as those used for the X-axis process, and thus an explanation thereof is omitted.

Figure 2:
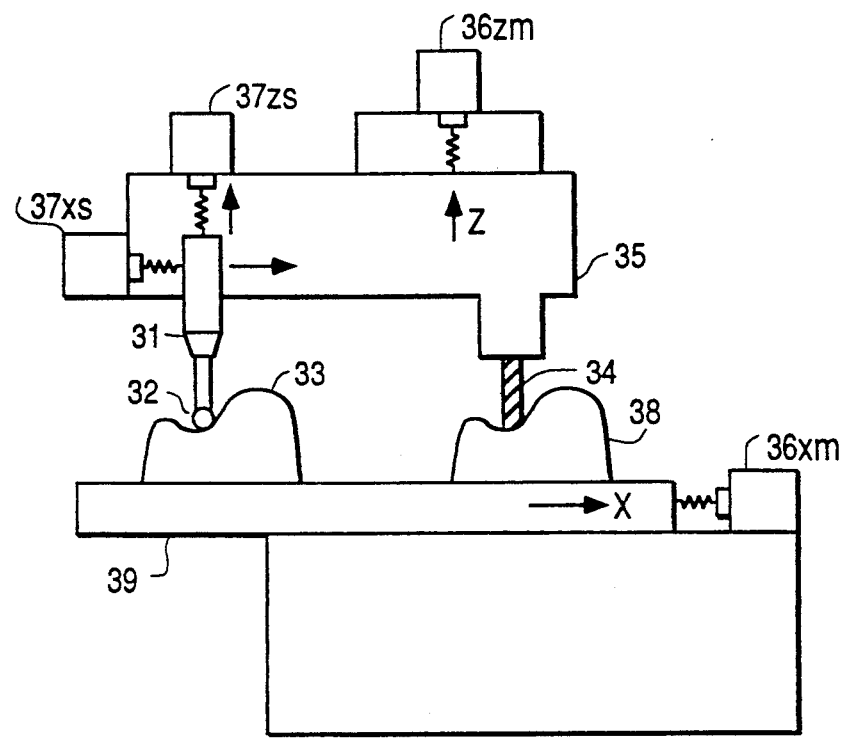
FIG. 2 is a diagram showing the arrangement of a tracing machine tool connected to a tracing control system according to an embodiment of the present invention.

FIG. 2 shows the arrangement of a tracing machine tool connected to the above tracing control system. In FIG. 2, a tracer head 31 detects amounts of displacement $\epsilon x$, $\epsilon y$, $\epsilon z$ in each of the X-axis, the Y-axis and the Z-axis directions, generated by contact of a stylus 32 at the tip end of the tracer head with a model 33, and inputs the detected amounts to the tracing control system 1.

A cutter 34 is attached to a column 35, and the column 35 is moved in the Z-axis direction by a main motor 36zm. Further, sub-motors 37zs and 37xs are attached to the column 35, and the tracer head 31 is further moved in the Z-axis direction and the X-axis direction in a manner such that the movement thereof is superimposed on the movement of the column 35 by these sub-motors 37zs and 37xs. A workpiece 38 is fixed on a table 39, and the table 39 is moved in the X-axis direction by a main motor 36xm.

The main motors 36xm and 36zm are driven in accordance with the delay speed commands Vxm and Vzm, and the sub-motors 37xs and 37zs are driven in accordance with the delay speed commands Vxs and Vzs.

Figure 3:
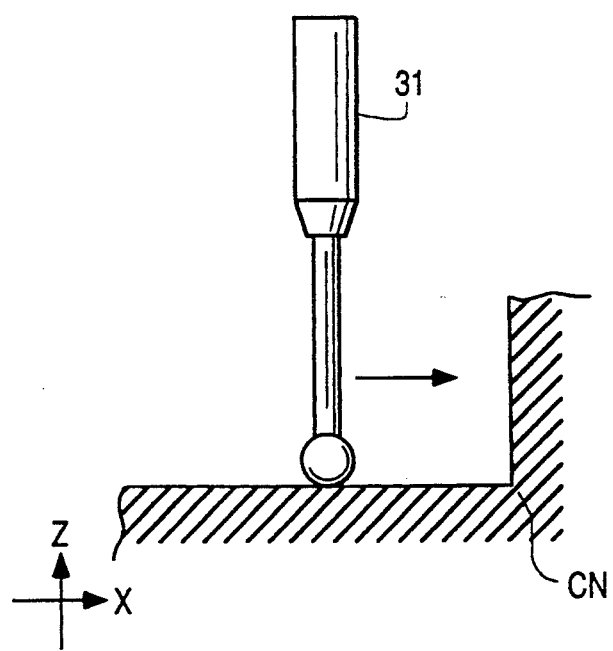
FIG. 3 is an illustration showing a corner of a model.

Next, the movement of the tracer head and the cutter, when the tracer head 31 comes to, for example, a corner CN as shown in FIG. 3 and the speed in the X-axis direction is reduced (0 in this case), will be explained with reference to FIG. 4. In FIG. 4, the axis of ordinate shows the quantity of the speed command and the axis of abscissa shows time. Here, if the leading time constant of the delay speed command Vxm is T1 and the leading time constant of the delay speed command Vxb of output of the filter B14b in FIG. 1 is T2, the delay speed command Vxm and the delay speed command Vxb in the first transition can be expressed as follows:

$$Vxm = vx(1 - e^{-t/T1})$$

$$Vxb = vx(1 - e^{-t/T2})$$

Also, if the trailing time constant of the delay speed command Vxm is T3 and the trailing time constant of the delay speed command Vxb is T4, the delay speed command Vxm and the delay speed command Vxb in the last transition can be expressed as follows:

$$Vxm = vx \cdot e^{-t/T3}$$

$$Vxb = vx \cdot e^{-t/T4}$$

Note, as the delay speed command Vxs of the X-axis sub-motor can be expressed as Vxs = Vxb − Vxm, the tracer head precedes the cutter by the amount of movement shown by $\Delta s1$ in FIG. 4, after the first transition. Also, the tracer head is returned by the amount of movement shown by $\Delta s2$ in the figure, upon stopping.

The precedence amount $\Delta s1$ and the return amount $\Delta s2$ are expressed as follows:

$$\Delta s1 = \int (vx(1 - e^{-t/T2}))dt - \int (vx(1 - e^{-t/T1}))dt$$

$$\Delta s2 = \int vx \cdot e^{-(t/T4)}dt - \int vx \cdot e^{-(t/T3)}dt$$

Further, in the present invention, as the respective time constants are set as:

$$T2 = T4, \quad T1 = T3$$

$$\Delta s1 = \Delta s2 = \Delta s$$

is established, and the precedence amount of the tracer head in the first transition is completely canceled out upon stopping.

Moreover, since $\Delta s$ is equal to the amount of over-run of the tracer head, the amount of movement of the cutter is decreased by the over-run amount in comparison with the movement of the tracer head, and thus an unwanted excess maching is prevented.

Note, the movement in the Z-axis direction is the same as described above, and thus an explanation thereof is omitted.

Also, the movements of the column and the main table, and the movement of the tracer head which is superimposed thereon, are carried out along the two axes X and Z in the above explanation, but the number of axes can appropriately increased or decreased.

In accordance with the present invention, as described above, since two delay speed commands are obtained by delaying the speed commands by different time constants, and one of these commands is used for the entire machine axis, and the difference in these speed commands for the axis is used for moving only the tracer head in a manner such that it is superimposed on the movement of this entire machine axis, the tracer head always precedes the cutter, and even if the tracer head over-runs the model at corners and the like, the cutter does not bite into the workpiece, and thus the precision of the tracing machining is improved.

We claim:

1. A tracing control system for machining a workpiece through tracing by calculating speed commands of respective axes, using change amounts detected by a tracer head, by moving a cutter relative to the workpiece through a control of the speed of the respective axes in accordance with the speed commands, and by moving the tracer head along the surface of a model, comprising:

first delay means for obtaining first delay speed commands by delaying the speed commands by predetermined time constants;

second delay means for obtaining second delay speed commands by delaying the speed commands by time constants different from said predetermined time constants;

difference calculating means for calculating differences between the first delay speed commands and the second delay speed commands;

first axis moving means for moving a predetermined axis based on the first delay speed commands; and second axis moving means for moving a specific axis in such that a movement of said specific axis is superimposed on a movement of the predetermined axis, and is parallel with the predetermined axis, based on said differences.

2. A tracing control system according to claim 1, wherein said stylus is attached to said specific axis.

3. A tracing control system according to claim 1, wherein the difference obtained by subtracting a leading time constant of said first delay means from a leading time constant of said second delay means is made equal to the difference obtained by subtracting a trailing time constant of said first delay means from a trailing time constant of said second delay means.

* * * * *

UNITED STATES PATENT AND TRADEMARK OFFICE
CERTIFICATE OF CORRECTION

PATENT NO. : 5,121,041

DATED : June 9, 1992

INVENTOR(S) : Hitoshi Matsuura et al.

It is certified that error appears in the above-identified patent and that said Letters Patent is hereby corrected as shown below:

Col. 4, line 55, after "such" insert --a manner--.

Signed and Sealed this

Fourteenth Day of September, 1993

Attest:

BRUCE LEHMAN

Attesting Officer     Commissioner of Patents and Trademarks